United States Patent [19]
de Schepper et al.

[11] Patent Number: 5,674,151
[45] Date of Patent: Oct. 7, 1997

[54] SHIFT CONTROL SYSTEM OF AN AUTOMATIC TRANSMISSION

[75] Inventors: Frank de Schepper, Tombeek-Overijse, Belgium; Kenji Suzuki, Okazaki, Japan

[73] Assignee: Aisin AW Co., Ltd., Japan

[21] Appl. No.: 618,298

[22] Filed: Mar. 18, 1996

[30] Foreign Application Priority Data

Mar. 16, 1995 [JP] Japan ................................. 7-057752

[51] Int. Cl.$^6$ .................................................. F16H 59/48
[52] U.S. Cl. .......................... 477/120; 477/80; 477/154; 477/902
[58] Field of Search .......................... 477/79, 80, 84, 477/120, 154, 156, 902

[56] References Cited

U.S. PATENT DOCUMENTS

| | | | |
|---|---|---|---|
| 5,046,383 | 9/1991 | Butts et al. | 477/120 |
| 5,060,541 | 10/1991 | Shimanaka | 477/154 |
| 5,072,390 | 12/1991 | Lentz et al. | 477/154 X |
| 5,182,969 | 2/1993 | Goto et al. | 477/120 |
| 5,345,842 | 9/1994 | Kondo | 477/120 |
| 5,389,052 | 2/1995 | Kruse et al. | 477/902 X |
| 5,445,579 | 8/1995 | Fujita et al. | 477/156 |
| 5,460,583 | 10/1995 | Kitada et al. | 477/154 |

Primary Examiner—Charles A. Marmor
Assistant Examiner—Peter T. Kwon
Attorney, Agent, or Firm—Lorusso & Loud

[57] ABSTRACT

A shift control system of an automatic transmission controls operating forces on frictional engaging elements being engaged and disengaged with gear elements during a shift operation by generating a target transmission variable which prevents a rate of change of a corresponding target input rotational speed from inverting at the start of the shift operation and/or at the end of the shift operation. The target transmission variable may be the target input rotational speed, a target gear ratio, or other variable corresponding to a target input rotational speed which has a rate of change gradually changing at the start and end of the shift operation so as to avoid any inversion of the rate of change within a predetermined duration after the start of the shift operation and within a predetermined duration before the end of the shift operation. The target transmission variable is applied along with a detected actual transmission variable to a feedback control which produces a signal for correcting a control hydraulic pattern produced in shift logic to operate a current control which controls a linear solenoid valve operating hydraulic servos to control the frictional engaging elements.

16 Claims, 3 Drawing Sheets

SHIFT CONTROL SYSTEM OF AN AUTOMATIC TRANSMISSION

BACKGROUND OF THE INVENTION

1. Field of the Invention

The present invention relates to a shift control system for an automatic transmission.

2. Description of the Prior Art

In an automatic transmission, rotation is transmitted to the transmission via a torque converter from an engine, is changed in speed, and then is transmitted to driving wheels. The transmission comprises a gear unit having a plurality of gear elements with frictional engaging elements such as clutches and brakes which are selectively engaged and disengaged to select the speed change (i.e., first gear, second gear, third gear, fourth gear, reverse, etc., hereinafter called gear states) of the transmission.

To prevent shift shock, burning of the friction engaging elements and the like while shifting from one gear state to another, the engaging and disengaging forces of the corresponding frictional elements are controlled. A start input rotational speed is detected. A target shift period for the period from start of the shift operation to end of the shift operation is set. Target input rotational speeds for the shift operation are set. Then the actual input rotational speed is monitored, such as by counting the number of revolutions per unit time of an input shaft, and the operating forces on the corresponding engaging and disengaging frictional elements are controlled during the shift operation to cause the input rotational speed to follow the target input rotational speeds.

The target input rotational speeds of a prior art automatic transmission are illustrated in a time chart of FIG. 2 wherein line $N_{IS}$ represents the target input rotational speeds during a period of vehicle acceleration in which the transmission shifts from one gear state to a higher gear state. The target input rotational speed $N_{IS}$ increases in accordance with depression of an accelerator pedal (not shown) until the shift starts at time $t_A$ whereupon the target input rotational speed decreases until time $t_S$ when the shift ends. After time $t_S$ the target input rotational speed resumes its increase as demanded by the depressed position of the accelerator pedal.

In FIG. 3, a feedback control in the prior art shift control system applies a target rate of change $\Delta N_{IS}$, based upon the target input rotational speed $N_{IS}$, to one input of a subtracter 61 as a command value while an actual rate of change $\Delta N_{IF}$ calculated from readings of the monitored input rotational speed is applied to a second input to the subtracter 61 to implement a feedback control. Any difference between the target rate of change $\Delta N_{IS}$ and the actual rate of change $\Delta N_{IF}$ is applied to a control element 62 where the difference is multiplied by a control gain such as an integral gain KP to produce a hydraulic pressure set value P.

During the shift of the prior art transmission, the target rate of change $\Delta N_{IS}$ is constant and the target input rotational speed $N_{IS}$ is decreased gradually like a straight line, that is, a linear function as shown in FIG. 2. The rate of change $\Delta N_{IS}$ of the target input rotational speed $N_{IS}$ has a positive value before the start of the shift and changes abruptly to a negative value at the start of the shift; that is, the rate of change $\Delta N_{IS}$ of the target input rotational speed $N_{IS}$ is inverted from positive to negative at the time $t_A$ that the shift is started. Further, the rate of change $\Delta N_{IS}$ of the target input rotational speed $N_{IS}$ has a negative value before the end of the shift and changes abruptly to a positive value at the end of the shift; that is, the rate of change $\Delta N_{IS}$ of the target input rotational speed $N_{IS}$ is inverted from negative to positive at the time $t_S$ when the shift is ended.

Similarly during shift from a higher gear state to a lower gear state while a vehicle is decelerating, the rate of change of the prior art target input rotational speed changes abruptly from a negative value to a positive value at the start of the shift and changes abruptly from a positive value to a negative value at the end of the shift.

However, the shift control system of the prior art automatic transmission has had a problem in that the operation of the control system degrades as the frictional engaging elements and other elements in the hydraulic circuit become worn with the lapse of time, causing a change in the actual shift period and thus generating an error between the actual shift period and the target shift period.

Although it is conceivable to overcome an increase in the actual shift period by increasing the control gain of the control element 62 described above, such increase in gain tends to cause deviation of the actual input rotational speed from the target input rotational speed $N_{IS}$. Because the rate of change $\Delta N_{IS}$ of the target input rotational speed $N_{IS}$ is inverted from positive/negative to negative/positive when the shift is started and from negative/positive to positive/negative when the shift is ended, vibration, shift shock or the like are produced in prior art transmissions where the operation of the shift control has degraded.

Accordingly, it is an object of the present invention to solve the aforementioned problem of the prior art shift control system of the automatic transmission by providing a shift control system of an automatic transmission which is capable of preventing such vibration, shift shock or the like from occurring by bringing the actual shift period closer to the target shift period.

SUMMARY OF THE INVENTION

In order to achieve the aforementioned object, a shift control system of an automatic transmission in accordance with the invention generates a target transmission variable corresponding to a target input rotational speed which avoids inverting a rate of change of the corresponding target input rotational speed from positive/negative to negative/positive at least at the start of the shift operation or at the end of the shift operation. The shift control system comprises a transmission equipped with a gear unit having a plurality of gear elements with frictional engaging elements operating the gear elements in a plurality of gear states defining different fixed ratios between transmission input and output rotational speeds; an input shaft for transmitting rotational power from an engine to the transmission; an output shaft for outputting rotational power from the transmission to driving wheels; hydraulic servos for selectively engaging and disengaging the frictional engaging elements to shift gear states to change from one of the fixed ratios between input and output rotational speeds to another of the fixed ratios; a hydraulic pressure generator for generating control hydraulic pressures supplied to the hydraulic servos in accordance to control hydraulic patterns; and a control unit having an actual transmission variable detecting means for detecting an actual transmission variable which corresponds to actual transmission input rotational speed; target transmission variable generating means for generating the target transmission variable; feedback control means for implementing feedback control based on the target transmission variable and the actual transmission variable to output a control value; and shift logic setting means for generating the control hydraulic pattern based on the control value. Because the target transmission variable changes in a manner preventing the rate of change of the corresponding target input rotational speed from inverting from positive/negative to negative/positive at least either when the shift is started or when it is ended, the tendency of prior art transmissions to produce shock, vibration or the like is decreased.

According to a second aspect of the inventive shift control system of the automatic transmission, the target transmission variable generating means changes the target transmission variable without inverting the rate of change of the corresponding target input rotational speed from positive/negative to negative/positive for a first predetermined duration after the shift starts and for a second predetermined duration before the shift ends and changes the target transmission variable by inverting the rate of change by an even number of times during the shift.

According to a third aspect of the inventive shift control system of the automatic transmission, the number of times of the inversion from positive/negative to negative/positive of the rate of change of the corresponding target input rotational speed is two times.

According to a fourth aspect of the inventive shift control system of the automatic transmission, the control unit comprises current control means, the shift logic setting means outputs the control hydraulic signal based on a corrected control hydraulic pattern to the current control means and the current control means outputs a current command signal to the hydraulic pressure generating means corresponding to the control hydraulic signal.

According to a fifth aspect of the inventive shift control system of the automatic transmission, the target transmission variable generating means gradually changes the target transmission variable.

According to a sixth aspect of the inventive shift control system of the automatic transmission, the hydraulic pressure generating means is a linear solenoid.

According to a seventh aspect of the inventive shift control system of the automatic transmission, the transmission has an input rotational speed sensor for detecting a number of revolutions per unit time of the input shaft and an output rotational speed sensor for detecting a number of revolutions per unit time of the output shaft, and the actual transmission variable detecting means calculates an actual gear ratio based on signals from the input rotational speed sensor and the output rotational speed sensor.

Because the target transmission variable changes without inverting the rate of change of the corresponding target input rotational speed from positive/negative to negative/positive at least either at the start of the shift or the end of the shift, the target transmission variable may be changed so that the corresponding target input rotational speed is gradually reduced at the start of the shift and is gradually increased at the end of the shift.

Accordingly, the actual transmission variable may be brought closer to the target transmission variable at least when the shift is started or it is ended even if the control gain is increased in the feedback control means, so that vibration, shift shock or the like may be prevented from occurring at least either when the shift is started or it is ended. Also the actual shift period may be brought closer to the target shift period.

The above and other advantages of the present invention will become more apparent in the following description and the accompanying drawings.

DESCRIPTION OF THE PREFERRED EMBODIMENTS

Preferred embodiments of the present invention will be explained in detail below with reference to the drawings.

Figure 1:
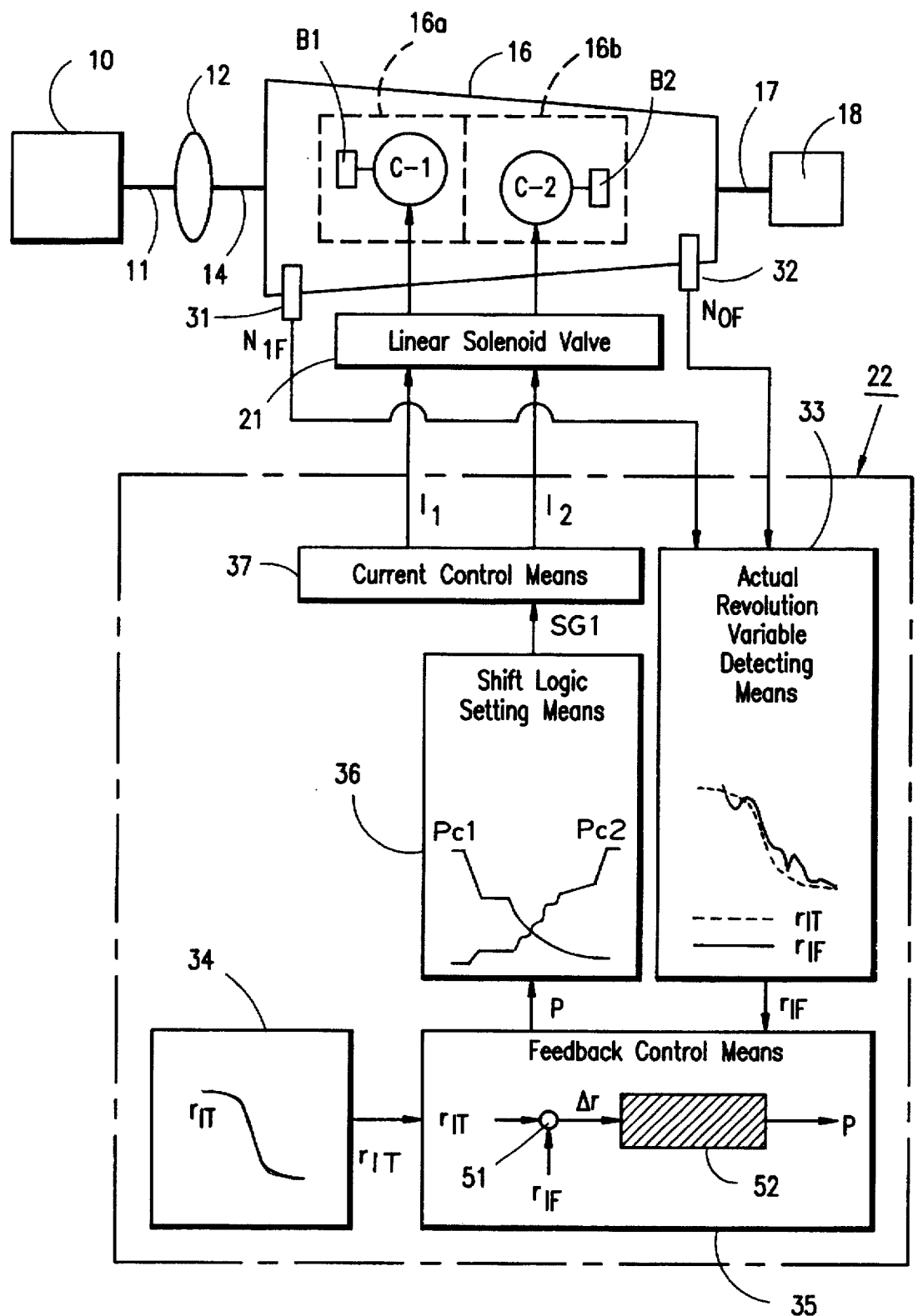
FIG. 1 is a conceptual diagram showing a shift control system of an automatic transmission according to a first embodiment of the present invention.
Figure 2:
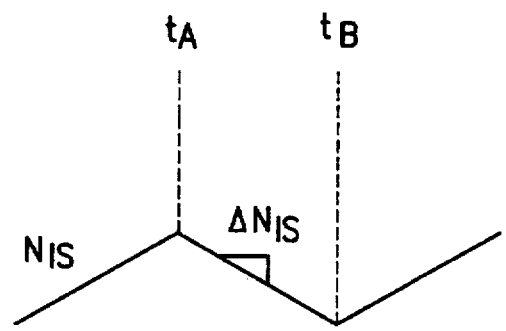
FIG. 2 is a time chart showing changes of an input rotational speed of a prior art shift control system of a automatic transmission.
Figure 3:
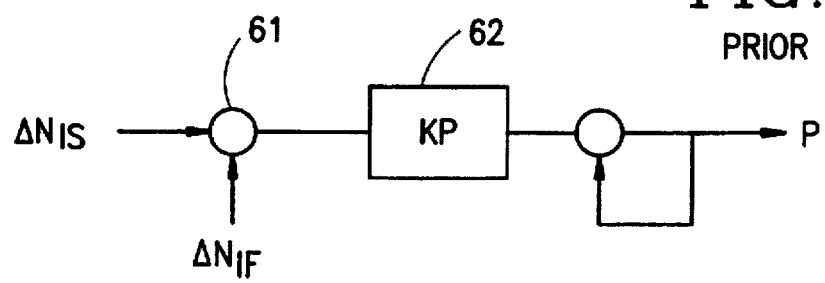
FIG. 3 is a diagram showing feedback control means in the prior art shift control system of the automatic transmission.

As shown in FIG. 1, rotation generated by an engine 10 is transmitted by an engine output shaft 11 to a torque converter 12 which provides a fluid coupling for transferring the input rotation. The rotation transferred by the torque converter 12 is then transmitted by an input shaft 14 to a transmission 16 which changes the rotational speed by increasing or decreasing the rotational speed. The rotation is transmitted from the transmission 16 by an output shaft 17 to a differential gear 18 which may further change the rotational speed and transmit the rotation to driving wheels (not shown).

The transmission 16 comprises a gear unit formed from a plurality of gear elements (only 16a, 16b shown) such as planetary gears and a plurality of frictional engaging elements (only B1, B2 shown) such as clutches and brakes to determine the transmission input to output rotation speed ratio. The frictional engaging elements are selectively engaged and disengaged with the gear elements to select one of a plurality of fixed input to output gear ratios such as first, second, third, fourth, reverse, etc. In the illustrated embodiment of FIG. 1, the transmission 16 has a hydraulic servo C-1 for engaging and/or disengaging the first frictional element B1 and a hydraulic servo C-2 for engaging and/or disengaging the second frictional element B2. For example when hydraulic pressure is supplied to the hydraulic servo C-1 and hydraulic pressure is drained from the hydraulic servo C-2, the first and second clutches or brakes are operated to select one of the fixed input to output transmission gear ratios, and when the hydraulic pressure is drained from the hydraulic servo C-1 and the hydraulic pressure is supplied to the hydraulic servo C-2, the first and second clutches or brakes are operated differently to select another of the fixed input to output transmission gear ratios.

It is noted that the hydraulic servos C-1 and C-2 are disposed in a hydraulic circuit (not shown) for attaining a number of speed ratios. Beside the hydraulic servos such as the hydraulic servo C-1 and hydraulic servo C-2 described above, the hydraulic circuit has a primary regulator valve (not shown) for generating a line pressure, a manual valve (not shown) for generating each range pressure corresponding to a selected range, a plurality of shift solenoid valves (not shown) turned On/Off corresponding to each speed, a 1-2 shift valve (not shown), 2-3 shift valve (not shown) and 3-4 shift valve (not shown) switched corresponding to On/Off of each solenoid valve and a linear solenoid valve 21.

The linear solenoid valve 21 provides a hydraulic pressure (hereinafter referred to as "control hydraulic pressure")

which is proportional to a value of a control current to control the engaging force of the first and second clutches, independently. While the transmission gear ratio is being changed by increasing hydraulic pressure to the second clutch and releasing hydraulic pressure to the first clutch, a control hydraulic pressure Pc1 is supplied by the linear solenoid valve 21 to the hydraulic servo C-1 of the first clutch and a control hydraulic pressure Pc2 is supplied to the hydraulic servo C-2 of the second clutch by the linear solenoid valve 21. During this gear shift operation, the control hydraulic pressure Pc1 supplied to the hydraulic servo C-1 is gradually reduced and the control hydraulic pressure Pc2 supplied to the hydraulic servo C-2 is gradually increased.

A control unit 22 provides the control signals for operating the hydraulic servos of the transmission 16. An input rotational speed sensor 31 and an output rotational speed sensor 32 provide inputs of the transmission input rotational speed (for example the number of revolutions of the input shaft 14 per unit time) and the transmission output rotational speed (for example the number of revolutions of the output shaft 17 per unit time) to the control unit. The control unit 22 comprises actual transmission variable detecting means 33, target transmission variable generating means 34, feedback control means 35, shift logic setting means 36 and current control means 37.

The control unit 22 determines a need for a gear shift operation based on traveling conditions such as the present car speed, a throttle opening angle and the like and generates a shift output. Then, a solenoid signal corresponding to the shift output is sent to each shift solenoid of the hydraulic circuit to turn on/off the shift solenoid valve and to supply the control hydraulic pressures Pc1 and Pc2 to the hydraulic servo C-1 and hydraulic servo C-2.

The input rotational speed sensor 31 detects an actual input rotational speed such as segments of angular rotation or a number of revolutions $N_{IF}$ per unit time of the input shaft 14 on the input side of the transmission 16 and the output rotational speed sensor 32 detects an actual output rotational speed such as segments of angular rotation or a number of revolutions $N_{OF}$ per unit time of the output shaft 17 on the output side of the transmission 16. It is noted that alternatively the actual transmission input rotational speed $N_{IF}$ can be determined from the rotational speed of another rotary member in the power transmission system between the input shaft 14 and the output shaft 17 and whose rotational speed changes when a shift is performed, and the actual transmission output rotational speed $N_{OF}$ can be determined from the rotational speed of still another rotary member whose rotational speed does not change due to a shift being performed.

The actual transmission variable detecting means 33 calculates an actual transmission input to output rotational speed ratio or transmission input to output gear ratio (hereinafter referred to as "actual gear ratio") $r_{IF}$:

$$r_{IF} = N_{IF}/N_{OF}$$

as an actual transmission variable based on the actual input rotational speed $N_{IF}$ and the actual output rotational speed $N_{OF}$. The actual gear ratio $r_{IF}$ is calculated every sampling time during the shift operation from the start of the shift to the end of the shift. Then, the calculated actual gear ratio $r_{IF}$ is output to the feedback control means 35.

The actual input rotational speed $N_{IF}$ and the actual output side rotational speed $N_{OF}$ change differently during the shift operation. When a shift is made from one gear to a higher gear (i.e. an up shift) while accelerating a vehicle, the actual input rotational speed $N_{IF}$ drops and the actual output side rotational speed $N_{OF}$ increases with a constant inclination due to constant accelerating force and inertia of the vehicle. Accordingly, the actual gear ratio $r_{IF}$ becomes smaller as the actual input rotational speed $N_{IF}$ drops and becomes a constant value after the end of the shift.

Figure 4:
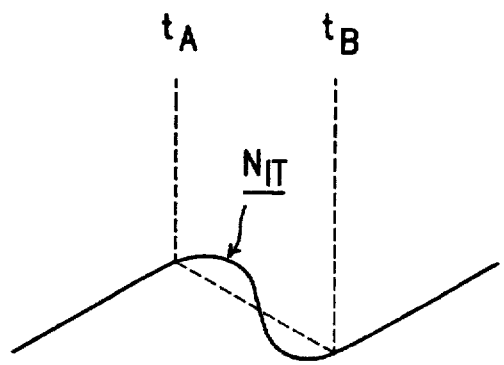
FIG. 4 is a time chart showing changes of an input rotational speed according to the first embodiment of the present invention.

The target transmission variable generating means 34 generates the target gear ratio $r_{IT}$ as the target transmission variable which corresponds to the target transmission input speed. The target gear ratio $r_{IT}$ is set so as to be able to prevent vibration, shift shock or the like from occurring at the time when the shift is started and when it is ended. For example, the target gear ratio $r_{IT}$ is set so that the target input rotational speed $N_{IT}$ during the shift operation forms a 200° or greater section of a sinusoidal wave as shown in FIG. 4. For an up shift as illustrated in FIG. 4, this 200° sinusoidal wave section between $t_A$ and $t_s$ extends from about 80° to 280° of a sine wave (from about −10° to 190° of a cosine wave). For a down shift, the 200° sinusoidal wave section of FIG. 4 is inverted or set to correspond to a sine wave section from about −100° to 100° (cosine wave section from about −190° to 10°).

Although the target input rotational speed $N_{IT}$ changes to a lower speed during the shift operation, the target input rotational speed continues to increase but at a decreasing rate for a predetermined duration (for example 10° or more at the start of the sinusoidal wave section of FIG. 4) after time $t_A$ at the start of the shift. The positive rate of change of the target input rotational speed $N_{IT}$ during this predetermined duration gradually decreases. Accordingly, the positive rate of change of the target input rotational speed $N_{IT}$ before the start of the shift continues as a positive value after the start of the shift and is not changed from a positive value to a negative value during the predetermined duration after the start $t_A$ of the shift.

After the predetermined duration after the start of the shift operation, the rate of the change of the target input rotational speed $N_{IT}$ changes from a positive value to a negative value and subsequently from the negative value back to a positive value, i.e. is inverted twice. The change from the negative value back to the positive value occurs a predetermined duration (for example 10° or more at the end of the sinusoidal wave section of FIG. 4) before the end $t_S$ of the shift operation. While the rate of change of the target input rotational speed is negative during the shift operation the input rotational speed $N_{IT}$ decreases. Then before the predetermined duration before the end $t_S$ of the shift operation, the input rotational speed begins to increase. The target input rotational speed $N_{IT}$ is increasing at time $t_S$ when the shift ends, and the rate of change of the target input rotational speed $N_{IT}$ is gradually increased during the predetermined duration before the end of the shift operation. Accordingly, the rate of change of the target input rotational speed $N_{IT}$ before the end of the shift and that after the shift both take positive values and is not inverted at the time $t_s$ when the shift ends.

It is noted that because the actual transmission variable detecting means 33 calculates the actual gear ratio $r_{IF}$ as the actual transmission variable, the target transmission variable generating means 34 calculates and generates the target gear ratio $r_{IT}$ as the target revolution variable based on the target input rotational speed $N_{IT}$.

The feedback control means 35 performs the feedback control by having the target gear ratio $r_{IT}$ as a command value and the actual gear ratio $r_{IF}$ as an input and outputs a control value P to the shift logic setting means 36. According to the present embodiment, the feedback control means 35 comprises a subtracter 51 and a control element 52. The target gear ratio $r_{IT}$ is sent as the command value and the target gear ratio $r_{IF}$ is sent as the input, respectively, to the subtracter 51 and a deviation $\Delta r$ obtained by subtracting the actual gear ratio $r_{IF}$ from the target gear ratio $r_{IT}$ is input to the control element 52. The control element 52 then multiplies the inputted deviation $\Delta r$ with a control gain such as proportion gain and stored gain and outputs a control value P.

The shift logic setting means 36 generates set patterns (hereinafter referred to as "control hydraulic patterns") of the control hydraulic pressures Pc1 and Pc2 described above, corrects the patterns in accordance to the control value P and outputs the corrected control hydraulic pattern to the current control means 37 as a control hydraulic signal SG1. Receiving the control hydraulic signal SG1, the current control means 37 outputs a current command value $I_1$ for the hydraulic servo C-1 and a current command value $I_2$ for the hydraulic servo C-2 to the linear solenoid valve 21.

As described above, the rate of change of the target input rotational speed $N_{IT}$ is suppressed from changing significantly at the time when the shift is started and when it is ended, so that the actual input rotational speed $N_{IF}$ will not be separated from the target input rotational speed $N_{IT}$ even if the control gain is increased. Accordingly, vibration, shift shock or the like may be prevented from occurring.

Further, because the control gain can be increased, it becomes possible to bring the actual shift period closer to the target shift period.

Figure 6:
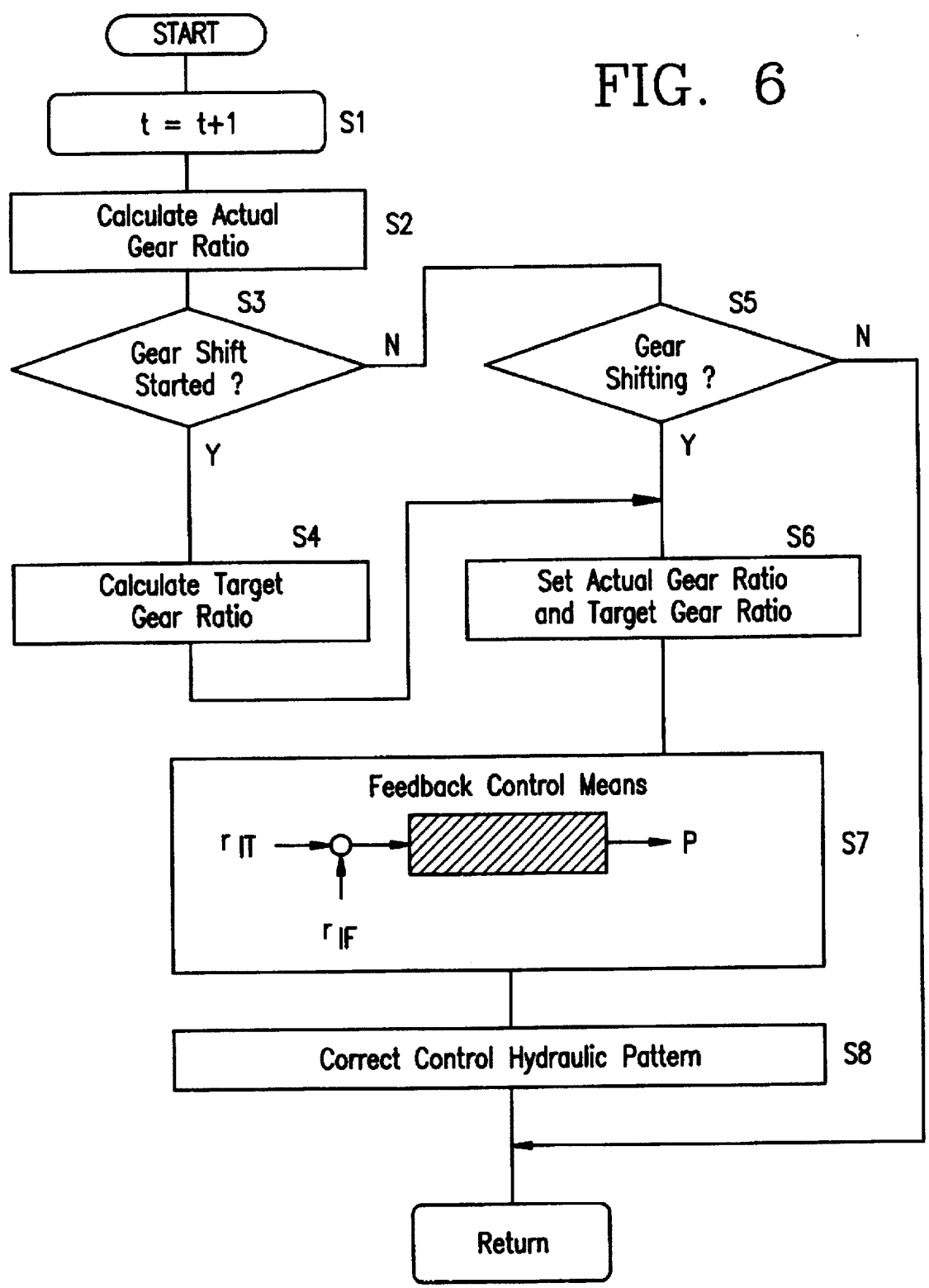
FIG. 6 is a flow chart showing an operation of the shift control system according to the first embodiment.

The operation of the shift control system of the automatic transmission constructed as described above will be explained below in a form of a flow chart in FIG. 6.

Step S1: Increment the sampling time t. For example, the sampling time t is incremented every 10 milliseconds in the present embodiment;

Step S2: Detect an actual transmission variable by detecting a target input rotational speed $N_{IF}$ and an actual output side rotational speed $N_{OF}$ and by calculating an actual gear ratio $r_{IF}$;

Step S3: Determine whether or not the transmission 16 (in FIG. 1) is at the start of a shift operation at the present sampling time t. Advance to Step S4 when the present sampling time is the start of a shift operation. When the present sampling time t is not the start of the a shift operation, advance to Step S5;

Step S4: Calculate the target gear ratios $r_{IT}$ from t=0 to t=T:

$$[r_{IT}]_{t=0}^{t=T} = \left[ \frac{N_{IT}}{N_{OF}} \right]_{t=0}^{t=T} = \left[ r_1 + \left( \frac{r_1 - r_2}{2} \right) \cdot \left( \cos\left( \frac{t}{T} \pi \right) - 1 \right) \right]_{t=0}^{t=T}$$

where $r_1$ is the gear ratio when the shift is started, $r_2$ is the gear ratio to which the transmission is to be shifted, and T is the target shift period.

Step S5: Determine whether or not the transmission 16 is performing a shift operation at the current sampling time t. Advance to Step S6 when currently performing a shift operation and if not, return;

Step S6: Set an actual gear ratio $r_{IF}$ from Step S2. Set a target gear ratio $r_{IT}$ read from Step S4.

Step S7: Perform feedback control by the feedback control means 35 to generate a control value P;

Step S8: Correct a control hydraulic pattern based on the control value P.

It is noted that although the actual transmission variable detecting means 33 calculates the actual gear ratio $r_{IF}$ as the actual transmission variable and the target transmission variable generating means 34 generates the target gear ratio $r_{IT}$ as the target transmission variable in the present embodiment, alternatively the actual transmission variable detecting means 33 detects the actual input rotational speed $N_{IF}$ as the actual transmission variable and the target transmission variable generating means 34 generates the target input rotational speed $N_{IT}$ as the target transmission variable.

Figure 5:
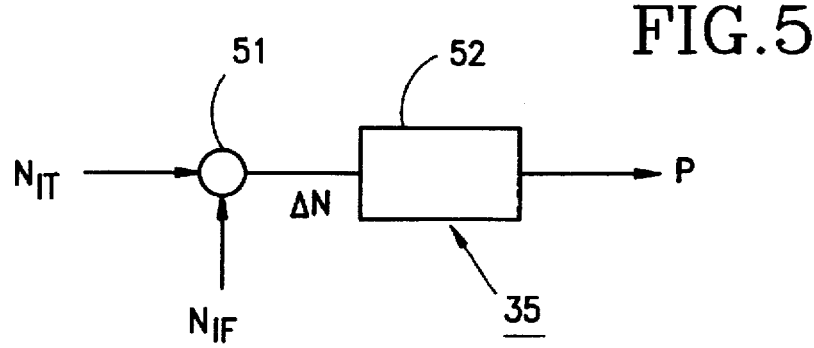
FIG. 5 is a diagram showing feedback control means according to a second embodiment of the present invention.

FIG. 5 is a diagram showing feedback control means according to the above alternative as a second embodiment of the present invention. In this case, the feedback control means 35 comprises the subtracter 51 and the control element 52, the target input rotational speed $N_{IT}$ is sent as a command value and the actual input rotational speed $N_{IF}$ is sent as an input, respectively, to the subtracter 51 and a deviation $\Delta N$ obtained by subtracting the actual input rotational speed $N_{IF}$ from the target input rotational speed $N_{IT}$ is input to the control element 52. The control element 52 then multiplies the inputted deviation $\Delta N$ with a control gain such as proportion gain and storage gain and outputs a control value P.

Then, the target transmission variable generating means 34 (FIG. 1) calculates the target input rotational speed $N_{IT}$:

$$[N_{IT}]_{t=0}^{t=T} = \left[ (\Delta N_{IF0} \cdot t) + N_{OF} \cdot \left( r_1 + \left( \frac{r_1 - r_2}{2} \right) \cdot \left( \cos\left( \frac{t}{T} \pi \right) - 1 \right) \right) \right]_{t=0}^{t=T}$$

where $\Delta N_{IF0}$ is the increase/decrease or rate of change of the number of input revolutions per sample time (i.e. transmission input rotation acceleration/deceleration) at the start of the shift operation. This rotation acceleration/deceleration $\Delta N_{IF0}$ changes the curve segment representing $N_{IT}$ between the start and the end of the shift operation so that the curve segment approximates a sine wave segment of 200° or more and the rate of change of the target input rotational speed $N_{IT}$ does not invert at the start and the end of the shift operation.

When the feedback control is implemented so that the actual input rotational speed $N_{IF}$ becomes the target input rotational speed $N_{IT}$ in the feedback control means 35 by detecting the actual input rotational speed $N_{IF}$ as the actual transmission variable, it becomes possible to implement feedback control which corresponds to respective deviation $\Delta N$ in a high rotational speed range where the deviation $\Delta N$ of the actual input rotational speed $N_{IF}$ becomes large and in a low rotational speed range where the deviation $\Delta N$ of the actual input rotational speed $N_{IF}$ becomes small. Accordingly, the follow up of the feedback control means 35 may be improved.

It is noted that the target transmission variable can be changed in accordance with many different curve segments other than sinusoidal curve segments during the shift operation from $t_A$ to $t_S$ to prevent the rate of change of the corresponding target input rotational speed from inverting simultaneously with the start or the end of the shift. For example, the target transmission variable can be changed so that the corresponding target input rotational speed is represented by any curve segment having a general zig-zag configuration between $t_A$ and $t_S$ with beginning and end portions of the zig-zag segment having positive/negative rates of change which are of the same sign (positive/negative) as the rate of change before $t_A$ and after $t_S$.

While preferred embodiments have been described, it is to be understood that the present invention is not confined to the embodiments described above and that various changes and modifications may be made based on the spirit of the present invention. It is therefore intended to cover in the appended claims all such changes and modifications.

What is claimed is:

1. A shift control system of an automatic transmission, comprising:

a transmission equipped with a gear unit having a plurality of gear elements for producing a transmission input to output gear ratio, an input shaft for transmitting rotation from an engine to said transmission, an output shaft for outputting rotation from said transmission to driving wheels, a plurality of frictional engaging elements for engaging and disengaging the corresponding gear elements to set the transmission input to output gear ratio at one of a plurality of fixed input to output transmission gear ratios, and hydraulic servos for operating the frictional engaging elements to shift the transmission input to output gear ratio from the one fixed input to output transmission gear ratio to another of the fixed input to output gear ratios during a shift operation;

hydraulic pressure generating means for generating control hydraulic pressures supplied to said hydraulic servos in accordance with a control hydraulic pattern to change the transmission input to output gear ratio from the one fixed input to output transmission gear ratio to the another fixed input to output transmission gear ratio during the shift operation; and a control unit comprising actual transmission variable detecting means for detecting an actual transmission variable which corresponds to actual transmission input rotational speed during the shift operation;

target transmission variable generating means for generating a target transmission variable which corresponds to target transmission input rotational speed during the shift operation;

feedback control means for implementing feedback control based on said target transmission variable and said actual transmission variable to output a control value; and shift logic setting means for generating the control hydraulic pattern and correcting the control hydraulic pattern based on said control value;

said target transmission variable generating means changing the target transmission variable without inverting a rate of change of the corresponding target transmission input rotational speed from positive/negative to negative/positive at least either when the shift operation starts or when the shift operation ends.

2. The shift control system of the automatic transmission according to claim 1, wherein said target transmission variable generating means changes the target rotational speed variable without inverting the rate of change of the corresponding target transmission input rotational speed from positive/negative to negative/positive when the shift operation starts and when the shift operation ends and changes the target transmission variable by inverting the rate of change by an even number of times during the shift operation.

3. The shift control system of the automatic transmission according to claim 2, wherein the number of times of the inversion from positive/negative to negative/positive of said rate of change is two times.

4. The shift control system of the automatic transmission according to claim 1, wherein said control unit includes current control means, said shift logic setting means outputs a control hydraulic signal based on the corrected control hydraulic pattern to said current control means, and said current control means outputs a current command signal to said hydraulic pressure generating means corresponding to said control hydraulic signal.

5. The shift control system of the automatic transmission according to claim 1, wherein said target transmission variable generating means gradually changes the target transmission variable during the shift operation.

6. The shift control system of the automatic transmission according to claim 5, wherein said hydraulic pressure generating means is a linear solenoid.

7. The shift control system of the automatic transmission according to claim 5, wherein said transmission has an input rotational speed sensor for detecting a number of revolutions of the input shaft and an output rotational speed sensor for detecting a number of revolutions of the output shaft, and said actual transmission variable detecting means calculates an actual gear ratio based on signals from said input rotational speed sensor and said output rotational speed sensor.

8. A shift control system of an automatic transmission, comprising:

a transmission equipped with a gear unit having a plurality of gear elements for producing a transmission input to output gear ratio, an input shaft for transmitting rotation from an engine to said transmission, an output shaft for outputting rotation from said transmission to driving wheels, a plurality of frictional engaging elements for engaging and disengaging the corresponding gear elements to set the transmission input to output gear ratio at one of a plurality of fixed input to output transmission gear ratios, and hydraulic servos for operating the frictional engaging elements to shift the transmission input to output gear ratio from the one fixed input to output transmission gear ratio to another of the fixed input to output gear ratios during a shift operation;

hydraulic pressure generating means for generating control hydraulic pressures supplied to said hydraulic servos in accordance with a control hydraulic pattern to change the transmission input to output gear ratio from the one fixed input to output transmission gear ratio to the another fixed input to output transmission gear ratio during the shift operation; and a control unit comprising actual transmission variable detecting means for detecting an actual transmission variable which corresponds to actual transmission input rotational speed during the shift operation;

target transmission variable generating means for generating a target transmission variable which corresponds to target transmission input rotational speed during the shift operation;

feedback control means for implementing feedback control based on said target transmission variable and said actual transmission variable to output a control value; and shift logic setting means for generating the control hydraulic pattern and correcting the control hydraulic pattern based on said control value; and said target transmission variable generating means changing the target transmission variable without inverting a rate of change of the corresponding target transmission input rotational speed from positive/ negative to negative/positive at least for a predetermined duration either after the shift operation starts or before the shift operation ends.

9. The shift control system of the automatic transmission according to claim 8, wherein said target transmission variable generating means changes the target rotational speed variable without inverting the rate of change of the corresponding target transmission input rotational speed from positive/negative to negative/positive for a first predetermined duration after the shift operation starts and for a second predetermined duration before the shift operation ends and changes the target transmission variable by inverting the rate of change by an even number of times during the shift operation.

10. The shift control system of the automatic transmission according to claim 9, wherein the number of times of the inversion from positive/negative to negative/positive of said rate of change is two times.

11. The shift control system of the automatic transmission according to claim 8, wherein said control unit includes current control means, said shift logic setting means outputs a control hydraulic signal based on the corrected control hydraulic pattern to said current control means, and said current control means outputs a current command signal to said hydraulic pressure generating means corresponding to said control hydraulic signal.

12. The shift control system of the automatic transmission according to claim 8, wherein said target transmission variable generating means gradually changes the target transmission variable during the shift operation.

13. The shift control system of the automatic transmission according to claim 12, wherein said hydraulic pressure generating means is a linear solenoid.

14. The shift control system of the automatic transmission according to claim 12, wherein said transmission has an input rotational speed sensor for detecting a number of revolutions of the input shaft and an output rotational speed sensor for detecting a number of revolutions of the output shaft, and said actual transmission variable detecting means calculates an actual gear ratio based on signals from said input rotational speed sensor and said output rotational speed sensor.

15. The shift control system of the automatic transmission according to claim 8 wherein said target transmission variable generating means gradually changes the target transmission variable during the shift operation in accordance with a curve approximating a segment of a sine curve.

16. The shift control system of the automatic transmission according to claim 11, wherein said target transmission variable generating means gradually changes the target transmission variable so as to correspond with a target transmission input speed variable which, during the shift operation, is in accordance with a curve approximating a 200° segment of a sine curve.

* * * * *